United States Patent
Ji et al.

(10) Patent No.: US 12,495,421 B2
(45) Date of Patent: Dec. 9, 2025

(54) INTER-USER EQUIPMENT RESOURCE ALLOCATION

(71) Applicant: Nokia Technologies Oy, Espoo (FI)

(72) Inventors: Lianghai Ji, Aalborg (DK); Nuno Pratas, Aalborg (DK); Ling Yu, Kauniainen (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 377 days.

(21) Appl. No.: 18/248,769

(22) PCT Filed: Sep. 22, 2021

(86) PCT No.: PCT/IB2021/058654
§ 371 (c)(1),
(2) Date: Apr. 12, 2023

(87) PCT Pub. No.: WO2022/079526
PCT Pub. Date: Apr. 21, 2022

(65) Prior Publication Data
US 2023/0379912 A1    Nov. 23, 2023

Related U.S. Application Data

(60) Provisional application No. 63/091,713, filed on Oct. 14, 2020.

(51) Int. Cl.
*H04W 72/20*    (2023.01)
*H04W 72/04*    (2023.01)
*H04W 72/40*    (2023.01)
*H04W 76/14*    (2018.01)

(52) U.S. Cl.
CPC .......... *H04W 72/20* (2023.01); *H04W 76/14* (2018.02)

(58) Field of Classification Search
CPC ...... H04W 72/20; H04W 72/02; H04W 76/14
(Continued)

(56) References Cited

U.S. PATENT DOCUMENTS

2018/0027429 A1* 1/2018 Li ..................... H04W 8/24
                                                       455/426.1
2019/0223231 A1* 7/2019 Muraoka ........... H04W 76/11
(Continued)

OTHER PUBLICATIONS

IP.com search history (Year: 2025).*
(Continued)

*Primary Examiner* — Moustapha Diaby
(74) *Attorney, Agent, or Firm* — Carter, DeLuca & Farrell LLP

(57) ABSTRACT

Systems, methods, apparatuses, and computer program products for identifier (ID)-based inter-user equipment (UE) resource allocation (RA). A method may include receiving, at a first user equipment, a list of identifiers used for communication between a second user equipment and its one or more peer user equipment (UEs). The method may also include obtaining information of a first resource reserved for communication between the second user equipment and its one or more peer user equipment, based on the received list of identifiers. The method may further include determining a second resource for the second user equipment based on the obtained information of the first resource. In addition, the method may include allocating the second resource for sidelink communication of the second user equipment.

20 Claims, 9 Drawing Sheets

(58) Field of Classification Search
USPC .......................................................... 455/450
See application file for complete search history.

(56) References Cited

U.S. PATENT DOCUMENTS

| | | | | |
|---|---|---|---|---|
| 2020/0314612 | A1* | 10/2020 | Kang | H04W 72/20 |
| 2021/0144682 | A1* | 5/2021 | Baghel | H04L 5/0064 |
| 2021/0144727 | A1* | 5/2021 | Pan | H04W 4/40 |
| 2022/0353856 | A1* | 11/2022 | Luo | H04W 72/044 |
| 2023/0053351 | A1* | 2/2023 | Cheng | H04W 40/12 |
| 2023/0224765 | A1* | 7/2023 | Hahn | H04W 36/08 370/331 |

OTHER PUBLICATIONS

"New WID on NR sidelink enhancement", 3GPP TSG RAN Meeting #86, RP-193231, Agenda: 9.1.1, LG Electronics, Dec. 9-12, 2019, 6 pages.

"3rd Generation Partnership Project; Technical Specification Group Radio Access Network; NR; Multiplexing and channel coding (Release 16)", 3GPP TS 38.212, V16.3.0, Sep. 2020, pp. 1-152.

"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

International Search Report and Written Opinion received for corresponding Patent Cooperation Treaty Application No. PCT/IB2021/058654, dated Dec. 21, 2021, 16 pages.

"Sidelink resource allocation for Reliability enhancement", 3GPP TSG RAN WG1 #102-e, R1-2005840, Agenda: 8.11.2.2, Lenovo, Aug. 17-28, 2020, 3 pages.

"Inter-UE coordination in sidelink resource allocation", 3GPP TSG RAN WG1 Meeting #102-e, R1-2005255, Agenda: 8.11.2.2, Huawei, Aug. 17-28, 2020, 9 pages.

* cited by examiner

INTER-USER EQUIPMENT RESOURCE ALLOCATION

RELATED APPLICATION

This application was originally filed as PCT Application No. PCT/IB2021/058654, filed on Sep. 22, 2021, which claims priority from U.S. Provisional Application No. 63/091,713, filed on Oct. 14, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for identifier-based inter-user equipment resource allocation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bit rates on the order of 10-20 Gbit/s or higher, and will support at least enhanced mobile broadband (eMBB) and ultra-reliable low-latency communications (URLLC) as well as massive machine type communications (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein.

DETAILED DESCRIPTION

Figure 1:
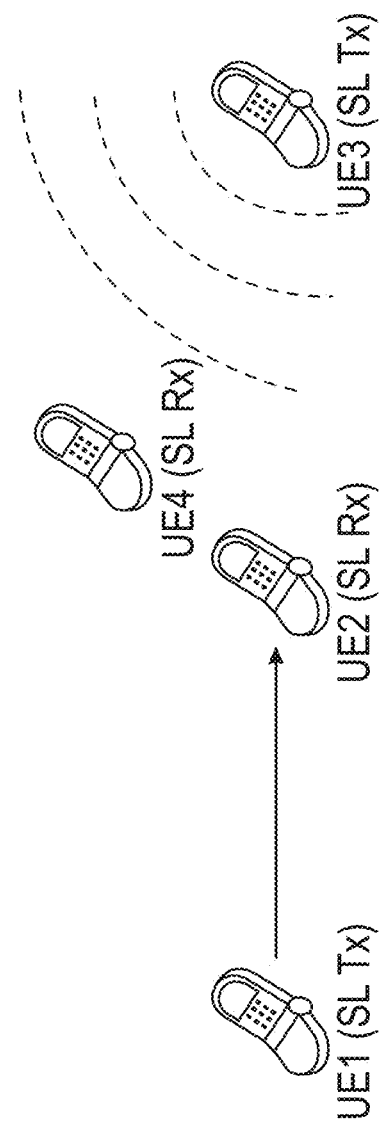
FIG. 1 illustrates an example of a Tx-based resource selection approach.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for identifier (ID)-based inter-user equipment (UE) resource allocation (RA).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

$3^{rd}$ Generation Partnership Project (3GPP) describes certain sidelink (SL) enhancements. For instance, the feasibility and benefit of RA enhancement(s) in mode 2 for enhanced reliability and reduced latency in consideration of both packet reception ratio (PRR) and Packet Inter-Reception (PIR) have been defined in 3GPP. 3GPP also describes inter-UE coordination with a set of resources determined at a UE-A. This set of resources may be sent to a UE-B in mode 2, and the UE-B may consider this in a resource selection for its own transmission.

According to 3GPP, new radio (NR) SL may be designed to facilitate a UE to communicate with other nearby UEs via direct/SL communication. In this regard, 3GPP describes two resource allocation modes, and a SL transmitter (Tx) UE that is configured with one of them to perform its NR SL transmissions. These modes may be denoted as NR SL mode 1 or NR SL mode 2. In mode 1, a SL transmission resource may be assigned by a network (NW) to the SL Tx UE, while a SL Tx UE in mode 2 may autonomously select its SL transmission resources.

In certain cases, a SL Tx UE in NR SL mode 2 may first perform a sensing procedure over the configured SL transmission resource pool(s) to obtain knowledge of reserved resource(s) by other nearby SL Tx UE(s). Based on the knowledge obtained from the sensing procedure, the SL Tx UE may exclude the reserved resource(s) and select resource (s) from available SL resources, accordingly. The sensing and resource selection procedure for NR SL mode 2 is described in 3GPP. Further, in order for a SL UE to perform sensing and obtain the necessary information to receive a SL transmission, it may decode SL control information (SCI). In this regard, 3GPP describes that the SCI associated with a data transmission may include a first stage SCI and a second stage SCI, as described in 3GPP.

In the first stage SCI, fields defined in each of the first stage SCI formats may be mapped to information bits $a_0$ to $a_{A-1}$. For instance, each field may be mapped in the order in which it appears in the description, with the first field mapped to the lowest order information bit $a_0$, and each successive field mapped to higher order information bits. Here, the most significant bit of each field may be mapped to the lowest order information bit for that field (e.g., the most significant bit of the first field may be mapped to $a_0$). Further, the first stage SCI may be used for scheduling physical sidelink shared channel (PSSCH) resources, where the second-stage SCI and data payload may be transmitted over on the PSSCH resources. In addition, various information may be transmitted by means of an SCI format 1-A including, for example, priority information, frequency resource assignment, time resource assignment, resource reservation period, demodulation reference signal (DMRS) pattern, second-stage SCI format, beta_offset indicator, number of DMRS ports, modulation and coding scheme (MCS), additional MCS table indicator, physical sidelink feedback channel (PSFCH) overhead indication, and reserved information.

In the second stage SCI, the fields defined in each of the second stage SCI formats may be mapped to the information bits $a_0$ to $a_{A-1}$. In addition, each field may be mapped in the order in which it appears in the description, with the first field mapped to the lowest order information bit $a_0$ and each successive field mapped to higher field order information bits. Further, the most significant bit of each field may be mapped to the lowest order information bit for that field (e.g., the most significant bit of the first field may be mapped to $a_0$). Additionally, in certain cases, one SCI format such as SCI format 2-A may be used for decoding of the data payload transmitted via PSSCH, with hybrid automatic repeat request (HARQ) operation when HARQ-acknowledgment (ACK) information includes ACK or non-acknowledgement (NACK), or when there is no feedback of HARQ-ACK/NACK information. In addition, various information may be transmitted by means of an SCI format 2-A including, for example, HARQ process number, new data indicator, redundancy version, source ID, destination ID, HARQ feedback enabled/disabled indicator, cast type indicator, and channel state information (CSI) request.

The second stage SCI may also use another SCI format, for example, SCI format 2-B for the decoding of PSSCH, with HARQ operation when HARQ-ACK information includes NACK, or when there is no feedback of HARQ-ACK information. In addition, various information may be transmitted by means of an SCI format 2-B including, for example, HARQ process number, new data indicator, redundancy version, source ID, destination ID, HARQ feedback enabled/disabled indicator, zone ID, and communication range requirement.

As can be seen from the above, an SCI may indicate the information used for sensing purposes. For example, a SL Tx UE may send an SCI and indicate reserved SL resources to nearby UEs, which may enable nearby UEs to avoid using those reserved resources. In addition, the SCI may include information used to identify a receiver that should receive the data payload (e.g., by using the source ID and/or destination ID carried in the second stage SCI). However, a drawback of NR SL mode 2 is that it is not capable of meeting ultra-high reliability requirements, as the associated sensing procedure being transmitter centric is not capable of preventing the hidden node problem.

FIG. 1 illustrates an example of a Tx-based resource selection approach. As illustrated in FIG. 1, UE1 may monitor the SL resource pool to perform a sensing procedure before it selects a non-occupied SL resource to transmit to the peer UE (e.g., UE2). However, if there is another UE (e.g., UE3) transmitting SL as well, for example to UE4 and/or UE2, the transmission from UE3 may not be sensed by UE1. This may occur when the signal propagation loss between UE1 and UE3 is high, for example, if UE1 is far away from UE3 and/or there is an obstacle between UE1 and UE3. Thus, UE1 may consider the resource(s) used by UE3 as available and select at least part of that resource(s) to transmit to UE2. If this occurs, UE 2 may experience either a high interference to receive from UE1, or a transmission collision if UE3 also transmits to UE2.

Inter-UE RA may serve as a solution in 3GPP to enhance NR SL performance for mode 2 by improving communication reliability and reduce collision ratio. In the case of inter-UE RA, a SL receiver (Rx) UE (e.g., UE2) may select the SL transmit resource based on its own sensing and assign the selected resource(s) to its SL peer Tx UE (e.g., UE1). Thus, the resource(s) used by UE3 may be excluded by UE2. In this case, UE1 may use the resource selected by UE2 to transmit to UE2. Thus, by using the inter-UE RA scheme, UE2 may attempt to ensure there is no transmission collision or strong interference over its selected resource(s).

In current NR SL solutions, each SL link (e.g., the communication link between UE1 and UE2) may be identified by a pair of Layer-2(L2) IDs (i.e., once source L2 ID and one destination L2 ID) in the radio layer. The pair of L2 IDs may be transmitted over a PC5 interface in order for neighboring UEs to identify the source transmitter and the intended receiver(s), and part of the pair of L2 IDs may carried in the second stage SCI, which is usually referred as Layer-1 (L1) ID.

Figure 2:
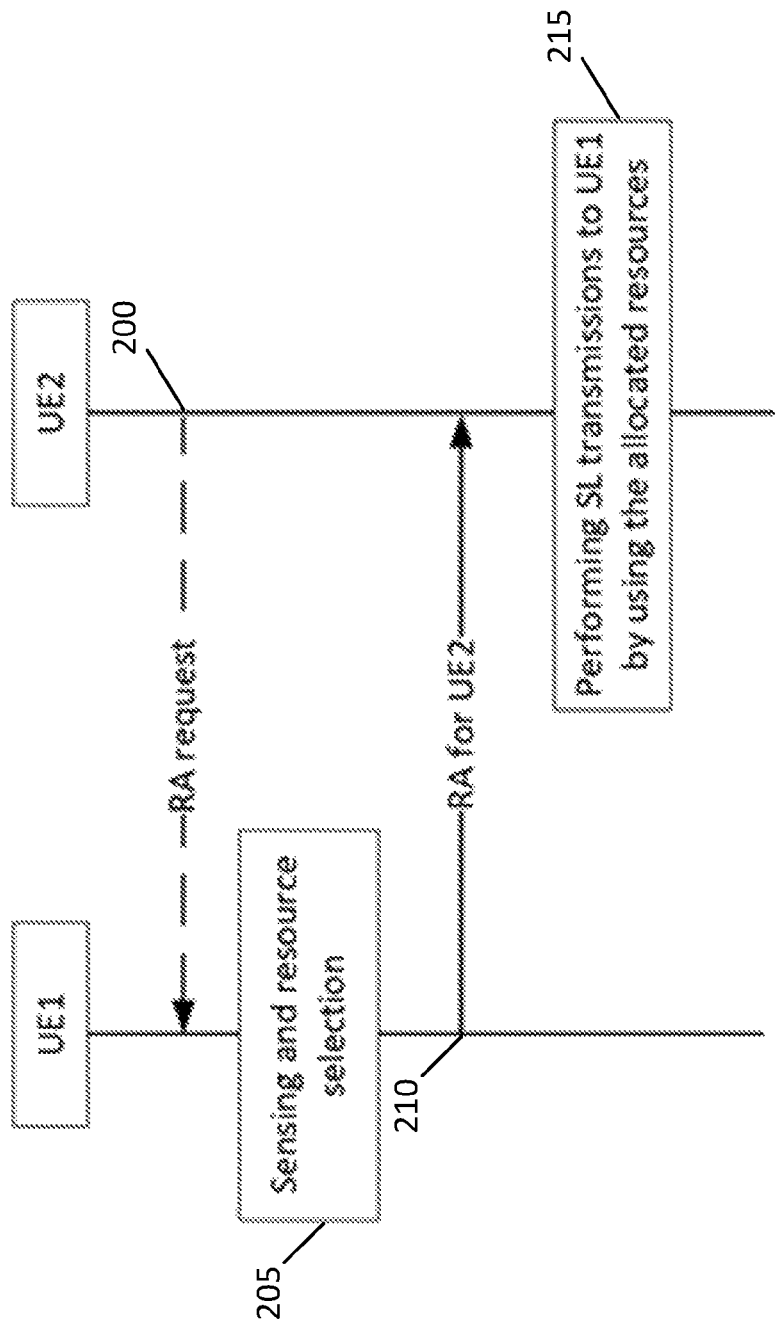
FIG. 2 illustrates an example signaling diagram of Rx-based inter-UE RA.

However, an issue with the current inter-UE RA scheme is that the resource allocating UE (e.g., a UE allocating SL resource to another UE) may not be aware of the resource usage of the resource requesting UE (e.g., a UE requesting SL transmit resource from the resource allocating UE in order to facilitate its own SL transmission). As such, efficiency of the inter-UE UA may be impacted. For instance, FIG. 2 illustrates an example signaling diagram of Rx-based inter-UE RA. As illustrated in FIG. 2, at 200, UE2 may request the SL resource allocation from UE1 to facilitate its transmission towards UE1. The request may include further information regarding data traffic characteristics including, for example, the traffic pattern information for periodic traffic and/or buffer status. Based on this information, at 205 and 210, UE1 may allocate SL resource(s) to UE2 according to its own sensing and resource selection procedure (e.g., using the current NR SL mode 2 RA) and optionally also the obtained information from UE2 regarding data traffic characters. At 215, UE2 may perform SL transmission to UE1 by using the allocated resources. In certain cases, UE1 may also allocate resources to UE2 without receiving any resource request message and, thus, the resource request message may be optional for inter-UE RA However, as UE1 is not aware of the other transmission/reception activities of UE2, the allocated resources may collide or overlap with other resources used by UE2 for other activities, for example, to communicate with another peer UE (not shown in FIG. 2). For instance, in one example, UE2 may have obtained or reserved another set(s) of SL transmitting resource(s) that overlap with the SL transmitting resource(s) allocated by UE1. The reserved resources may either be allocated by another UE (e.g., UE3, not shown in FIG. 2) to UE2, or selected by UE2 itself. In this case, if UE2 cannot support multiple simultaneous SL transmissions, UE2 may prioritize one transmission over another transmission, which leads a resource waste and additional delay to deliver the de-prioritized transmission. Further, although UE2 may support multiple simultaneous SL transmissions, if the time-and-frequency resources allocated by UE1 overlap (at least partially) with another reserved SL transmit resource, UE2 may need to prioritize one transmission over another as well.

In another example, the SL transmit resource(s) allocated by UE1 to UE2 may also collide or overlap in the time domain with the resource(s) used by another UE to transmit to UE2 (e.g., UE3, not shown in FIG. 2). In this case, UE2 may prioritize between SL transmission and SL reception, for example, due to the half-duplex constraint at UE2. To solve these problems, in one approach, before UE1 allocates the SL resource(s) to UE2, it may request or obtain the detailed resource usage information from UE2 to avoid allocating conflicting or overlapping resources. However, this approach may require a high signaling overhead to carry the detailed resource usage information from UE2 to UE1, and UE2 may need to send its updated time domain information to UE1 (e.g., every time before UE1 assigns a new SL transmit resource(s) to UE2 and/or when resource allocation of other UE2's communication activity has changed). Thus, certain example embodiments described herein may provide various ways for a resource allocating UE (e.g., UE1) to avoid the above-mentioned inter-UE RA collision or overlapping problems with a light signaling effort. It is noted, in certain example embodiments, the allocated resource(s) from UE1 may be considered by UE2 for UE2's SL transmission. For example, UE2 may use either whole or part of the allocated resources from UE1 to perform its SL transmission. In another example, UE2 may perform its SL transmission based on the allocated resources, for example, using another or new SL resource(s) in frequency domain with the same time resource as the allocated SL resource(s) (e.g., in the same SL slot).

Certain example embodiments may provide a mechanism where the resource allocating UE (e.g., UE1) collects a list of AS layer identifiers (IDs). According to certain example embodiments, the IDs may be used by the resource requesting UE (e.g., UE2). According to other example embodiments, the IDs may be used by the corresponding peer UE of the resource requesting UE (e.g., a third UE such as UE-n), which may receive from the resource requesting (UE2) over the resource allocated by the resource allocating UE (UE1). Additionally, or alternatively, in other example embodiments, the IDs may be used by UE2 in addition to being used by the corresponding peer UE (e.g., a third UE).

Figure 3:
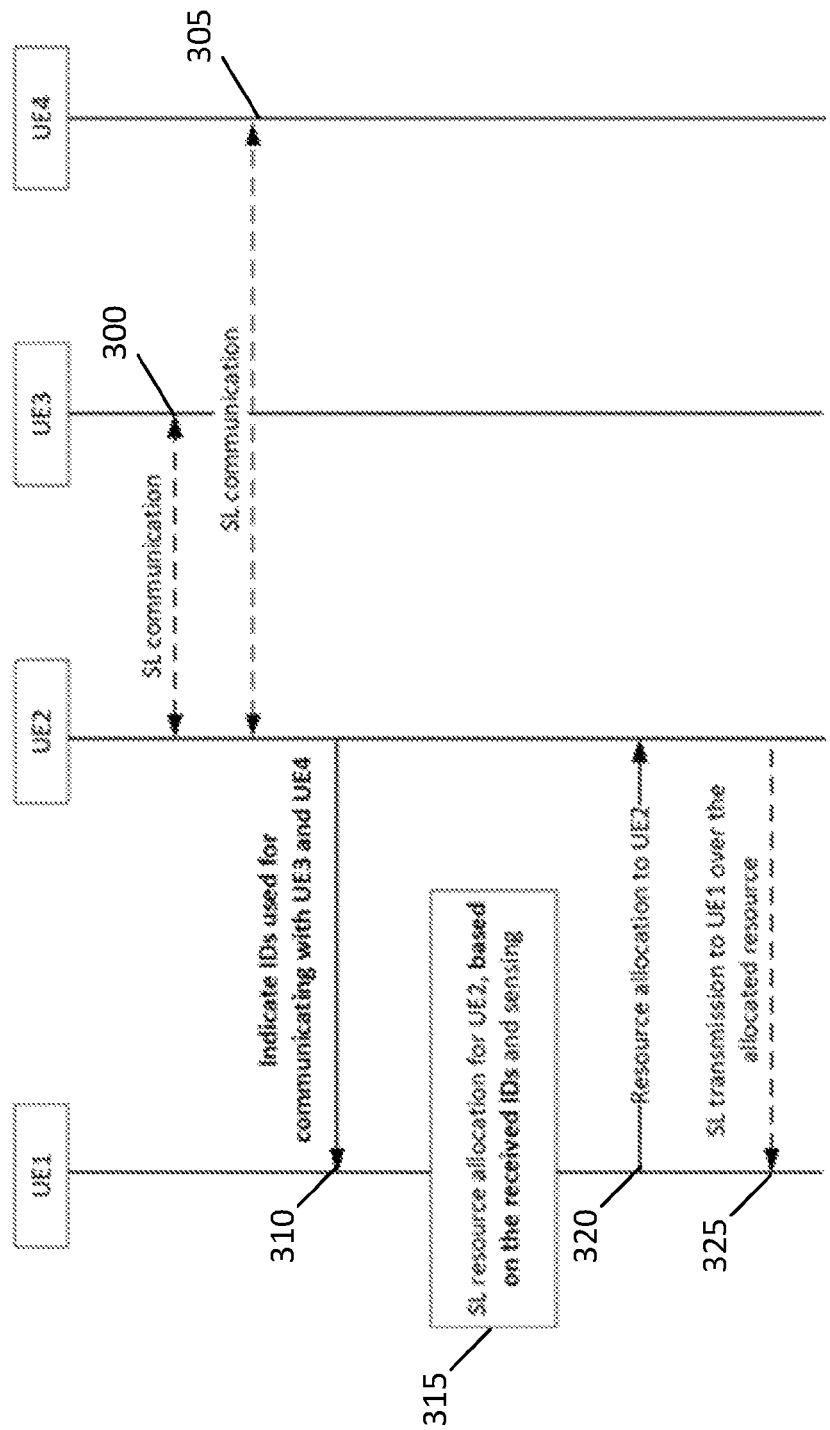
FIG. 3 illustrates a signaling diagram of communications between multiple UEs, according to certain example embodiments.

FIG. 3 illustrates a signaling diagram of communications between multiple UEs, according to certain example embodiments. For instance, as described in more detail herein, UE2 may indicate a list of AS layer IDs to UE1 when UE1 allocates resource(s) to UE2 for transmitting to UE1. In certain example embodiments, the AS layer ID(s) may be used by UE1 to estimate the other activities at UE2 and/or UE-n, which may be used to avoid allocating colliding or overlapping resources. In some example embodiments, if the requested or allocated resource will be used by UE2 to transmit to UE1, UE1 may receive a list of AS layer IDs (e.g., Layer-1/Layer-2 IDs) used by UE2 to communicate with other SL UEs including, for example, UE3 and UE4 illustrated in FIG. 3. As illustrated in FIG. 3, at 300, UE3 may perform SL communications with UE2, and at 305, SL communications may be performed between UE2 and UE4. At 310, UE2 may indicate to UE1, IDs used for communicating with UE3 and UE4. For instance, in certain example embodiments, UE2 may indicate to UE1 the AS layer IDs (e.g., Layer-1/Layer-2 IDs) used to communicate with other SL UEs (e.g., UE3 and UE4). With the information received at 310 from UE2, UE1 may, at 315, determine SL resource allocation for UE2 based on the received IDs and sensing procedure. At 320, UE1 may allocate resource(s) to UE2, and at 325, UE2 may perform SL transmission to UE1 over the allocated resource(s) received from UE1.

According to certain example embodiments, UE2 may consider including IDs fulfilling certain criterions in order to reduce the size of the list. In certain example embodiments, the criterion considered by UE2 may be one criterion, or a combination of one or more criterions. For example, in certain example embodiments, UE2's own ID(s) to communicate with the peer UEs, but not the peer UEs' IDs may be included. In other example embodiments, the IDs of UE2's and/or peer UEs' that corresponds to the SL communication for high priority traffic may be included. According to further example embodiments, the IDs of UE2's that corresponds to the SL communication using the resource assigned by a third UE may be included. In certain example embodiments, UE2 may include the IDs of the UE2's and/or peer UEs' that corresponds to the SL communication transmitted over periodic resources. According to other example embodiments, UE1 may further receive UE2's capability information regarding supporting multiple simultaneous transmissions and/or supporting simultaneous transmission and reception. In certain example embodiments, the capability information may be used together with the list of AS layer IDs by UE1 to select or allocate resource(s) for UE2, and avoid resource collision or overlap.

In certain example embodiments, the AS layer IDs indicated from UE2 to UE1 in FIG. 3 may include the IDs of UE2 itself to communicate with other UEs. For instance, the list may include layer-1 (L1) or layer-2 (L2) source IDs. For instance, in certain example embodiments, the L1 ID may be part of the L2 ID. Based on these IDs and sensing record, UE1 may derive the corresponding SL transmitting resources reserved by UE2 or allocated by another UE for UE2 to transmit to other UEs. In other example embodiments, the list may include the L1 or L2 destination IDs used by UE2 to receive from other UEs. In further example embodiments, the derived SL transmit and/or reception resources may enable UE1 to predict other transmission or reception activities of UE2.

According to certain example embodiments, the list of AS layer IDs may include the IDs of the links that are used to carry high-priority traffic with other UEs. For example, UE2 may indicate the AS layer IDs of the links transmitting data with a priority value lower than n (e.g., links with high priority). In this case, it may enable UE1 to estimate the high-priority activities of UE2 and, thus, the RA at UE1 may avoid colliding or overlapping resources with the resources for the high-priority links According to certain example embodiments, the priority value n may be determined by taking into account the priority value (e.g., a value of m) of the data to be transmitted over the resources assigned by UE1 (e.g., n m). In one example embodiment, UE2 may self-determine the priority value n. In another example embodiment, instead of having UE2 determine the priority value n, UE1 may also decide this value and send/update it to UE2, which may be used by UE2 to consider which IDs should be included in the list of AS layer IDs. In a further example embodiment, the priority value n may be configured by the NW for SL UEs in network coverage or pre-configured for the SL UEs out-of-coverage.

In certain example embodiments, the RA from UE1 may overlap or collide with the resources for SL communication of low-priority traffic since UE1's RA procedure may not take the low-priority traffic of UE2's into account. For example, the IDs of the UE2's and/or peer UEs' that corresponds to SL communication of low-priority traffic may not be indicated from UE2 to UE1 in the list of AS layer IDs. Thus, if such a collision occurs, UE2 may decide to deprioritize the transmission of the low-priority traffic. According to certain example embodiments, instead of or in addition to the priority dependent ID list being provided to UE1, the information of the priority list corresponding to each ID may also be provided to UE1. As such, UE1 may determine the RA by taking into account the relevant IDs that have the traffic with the certain priorities.

According to certain example embodiments, the list of AS layer IDs may include the IDs of the links whose resources are assigned by the third UE(s) (e.g., UE-k). In this case, the RA at UE1 may attempt to avoid collision or overlap with the resources allocated by the third UE(s). However, the resources allocated by UE1 may still collide or overlap with the resources selected by UE2, and UE2 may perform a resource reselection if such a collision or overlap occurs. Operating in this manner may make it easier for UE2 to reselect a resource that was selected by UE2 itself, compared to reselecting a resource that was assigned by a third UE (UE-k) since inter-UE coordination may be required for such a resource reselection.

In other example embodiments, the list of AS layer IDs may include the IDs of the links that transmit over periodic resources since under certain cases, UE1 may not be able to predict the resource used for dynamic transmissions. In some example embodiments, UE2 may further indicate its capability of supporting multiple simultaneous transmissions and/or supporting simultaneous transmission and reception to UE1. The capability information of UE2 may be used by UE1 together with the list of AS layer IDs to perform inter-UE RA.

For instance, in certain example embodiments, the AS layer IDs may be used to identify the used/reserved SL transmit/reception resources by UE2. In some example embodiments, if UE2 cannot support simultaneous SL transmissions, UE1 may allocate SL resources not overlapping in the time domain with the SL transmit resource used/reserved by UE2. Further, if UE2 can support simultaneous SL transmission, UE1 may allocate the SL resources that overlaps in the time domain with the SL transmission resource used/reserved by UE2 for other transmission, but not (partially) overlap in the frequency-domain According to certain example embodiments, if UE2 has a half-duplex constraint (i.e., not supporting simultaneous transmission and reception), UE1 may avoid assigning SL resources overlapping with the used/reserved SL reception resources of UE2 in the time domain. Further, if UE2 does not have a half-duplex constraint (i.e., UE2 can perform full duplex), UE1 may allocate the SL resources that overlaps in the time domain with the SL reception resource used/reserved by UE2 for other receptions, but not (partially) overlap in the frequency-domain.

In certain example embodiments, when the UE capability information of UE2 is not available at UE1, UE1 may perform a default approach including, for example, considering UE2 can neither support simultaneous transmission nor support full duplex. Additionally, in other example embodiments, if UE2 performs a link modification procedure (e.g., to modify the AS layer IDs) with another SL peer UE (e.g., UE3), UE2 may send an update to UE1 for updating the list of the AS layer IDs (e.g., updating the AS layer ID(s) used for the link between UE2 and UE3). According to some example embodiments, the AS layer ID modification procedure may not take place frequently. Thus, a frequent update of the AS layer ID(s) for a considered SL may not be expected.

Figure 4:
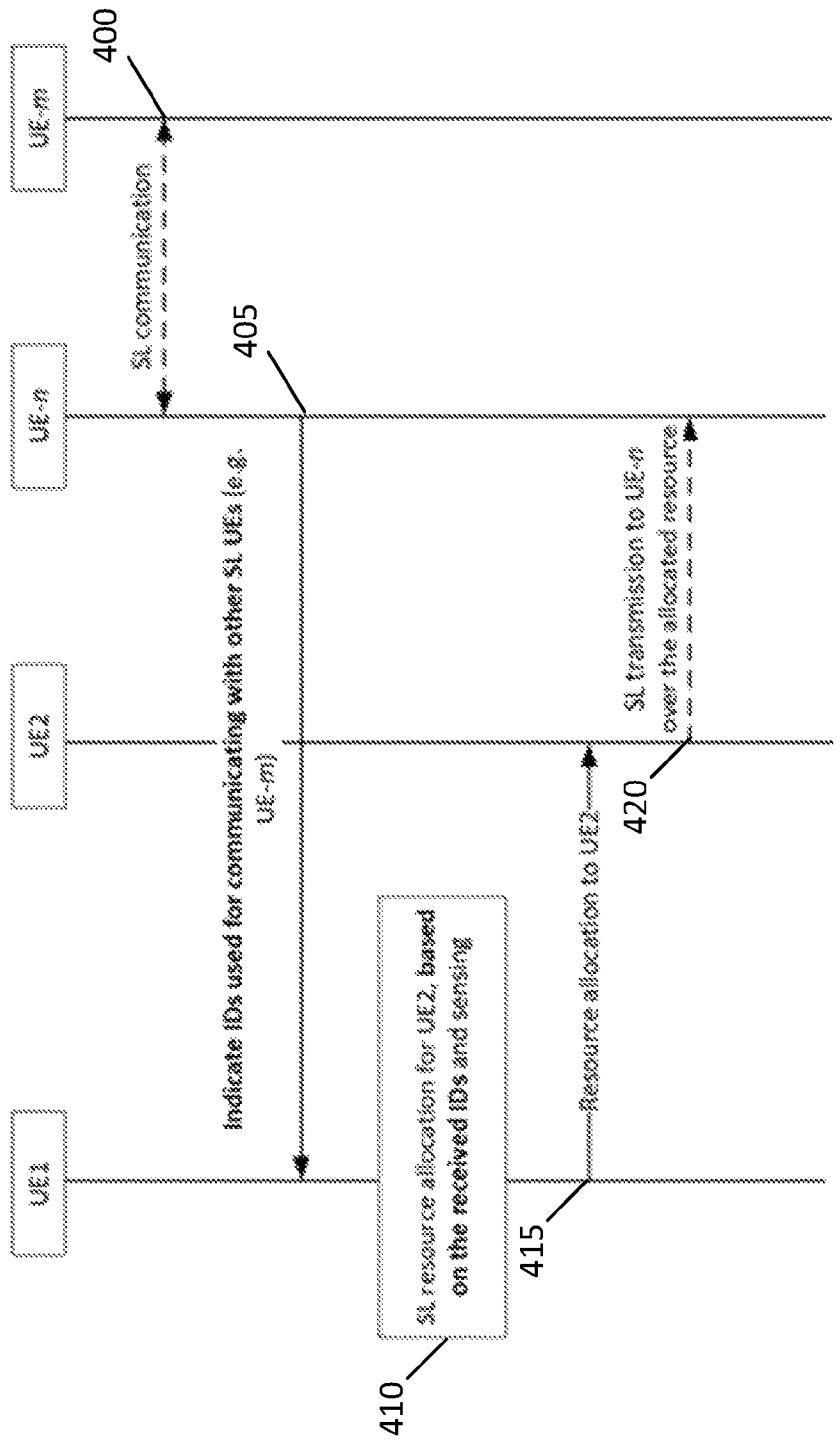
FIG. 4 illustrates another signaling diagram of communications between multiple UEs, according to certain example embodiments.

FIG. 4 illustrates another signaling diagram of communications between multiple UEs, according to certain example embodiments. For instance, as described in more detail herein, UE-n may indicate a list of AS layer IDs to UE1 when UE1 allocates resource(s) to UE2 for transmitting to UE-n. In certain example embodiments, if the requested or allocated resource will be used by UE2 to transmit to at least a third UE (e.g., UE-n), UE1 may further receive a list of AS layer IDs used by the third UE. As illustrated in FIG. 4, at 400, UE-n and UE-m may perform SL communications. At 405, UE-n may indicate, to UE1, IDs used for communicating with other SL UEs (e.g., UE-m). In particular, UE1 may be informed with the list of AS layers IDs used by the third UE(s) (UE-n), to whom the resource requesting UE (UE2) may transmit over the resource allocated by the resource allocating UE (UE1). With the information received at 405 from UE-n, UE1 may, at 410, determine SL resource allocation for UE2 based on the received IDs and sensing procedure. At 415, UE1 may allocate resource(s) to UE2. Further, at 420, UE2 may perform SL transmission to UE-n over the allocated resource(s) received from UE1.

According to certain example embodiments, the received list of AS layer IDs may include the IDs used by the third UE (UE-n) to communicate with other UEs (e.g., UE-m). Further, in other example embodiments, UE1 may receive the capability information from the third UE (UE-n). According to further example embodiments, the same embodiments for UE2 (e.g., regarding how to reduce the size of the indicated ID list, and how UE1 utilizes the ID list and the capability information) may also be applicable for the third UE (UE-n).

In certain example embodiments, the list of AS layer IDs may be used by UE1 to identify the communication between UE-n with at least a fourth UE (e.g., UE-m). In addition, the resource requesting UE may be informed of the capability information of the third UE (UE-n). According to certain example embodiments, the list of AS layer IDs used by UE-n may be transmitted to UE1 either directly or via UE2. In addition, the above-described procedures/embodiments to reduce the size of UE2's AS layer ID list may also be applicable for UE-n.

According to certain example embodiments, UE1 may avoid allocating UE2 with SL transmit resources that at least partially overlap in both the time and frequency domains with a SL reception resource used by UE-n, no matter if the SL reference signal received power (RSRP) level over the SL reception resource used by UE-n may be sensed by UE1 as lower than the SL RSRP threshold value used in the NR SL mode 2 sensing and resource selection procedure to consider that SL reception resource as available.

In certain example embodiments, aside from the AS layer IDs collected from UE-n, the capability of UE-n to support simultaneous transmission/reception may also be considered by UE1 to allocate resources for UE2 to transmit to UE-n. Thus, in some example embodiments, UE1 may avoid allocating UE2 with SL transmit resources that overlap in the time domain with the transmit resource from UE-n to a UE-m, if UE-n has a half-duplex constraint. As such, it may be possible for the resource allocating UE (UE1) to take into account the resource usage conditions and avoid resource allusion/overlap issues at not only the resource requesting UE (UE2), but also its corresponding peer UE (UE-n), which may receive over the resource allocated by the resource allocating UE (UE1).

According to certain example embodiments, UE1 may keep locally a record of the sensing procedure outcome of what happened previously, and the record may include the association or mapping between a reserved resource and the corresponding AS layer ID(s) (e.g., layer-1 ID(s)). Thus, once UE1 receives the list of AS layer IDs used by UE2 and/or UE-n, it may check the resources reserved and associated to the IDs included in that list. Afterwards, UE1 may perform resource selection and exclude or avoid allocating the SL resources that may collide or overlap with the activities of the resource requesting UE (UE2) and/or its peer UEs (UE-n). In other words, the colliding or overlapping resources may be excluded from the resource selection/allocation procedure.

In certain example embodiments, when UE1 allocates UE2 with a SL transmit resource for transmitting to UE-n, UE1 may avoid allocating UE2 with a SL transmit resource that overlaps in both the time and frequency domains with a SL reception resource used by UE-n. This may occur even though the SL RSRP level over the SL reception resource used by UE-n may be sensed by UE1 as being very low.

In other example embodiments, when UE2 cannot support simultaneous SL transmissions, UE1 may allocate SL resources not overlapping in the time domain with the SL transmit resource used/reserved by UE2. However, if UE2 can support simultaneous SL transmission, UE1 may allocate UE2 with the SL resources that overlap in the time domain with the SL transmission resource used/reserved by UE2 for other transmissions, but not (partially) overlaps in the frequency-domain.

According to certain example embodiments, if UE2/UE-n has a half-duplex constraint (i.e., not supporting simultaneous transmission and reception), UE1 may avoid assigning UE2 with SL transmit resources overlapping with the SL reception resources used/reserved by UE2/UE-n in the time domain. However, if UE2/UE-n does not have a half-duplex constraint, UE1 may allocate UE2 with the SL transmit resource that overlaps in the time domain with the SL reception resource used/reserved by UE2/UE-n for other receptions but not (partially) overlaps in the frequency-domain.

In certain example embodiments, when the UE capability information of UE2 and/or UE-n is not available at UE1, UE1 may perform a default approach. For example, UE1 may assume that both simultaneous transmissions and full duplex may not be supported by UE2 and/or UE-n. According to certain example embodiments, the list of IDs may be transmitted as the medium access control (MAC) control element (CE) or radio resource control (RRC) signaling either together with SL inter-UE resource allocation request, or as a separate signaling message to the resource assigning/allocating UE.

Figure 5:
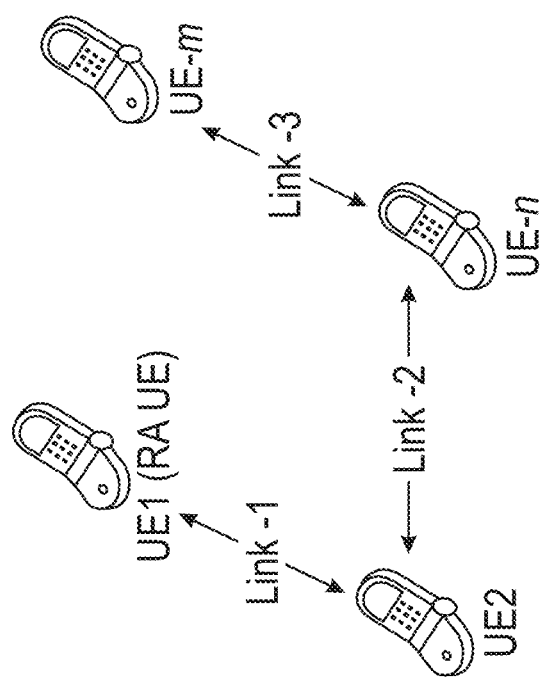
FIG. 5 illustrates a communication scenario, according to certain example embodiments.
Figure 6:
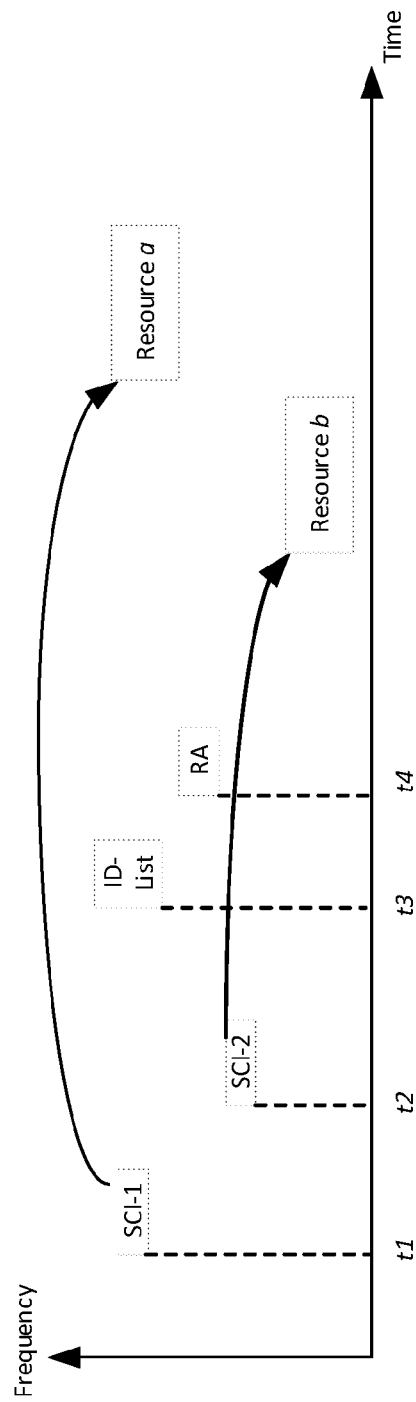
FIG. 6 illustrates a time domain relationship, according to certain example embodiments.

FIG. 5 illustrates a communication scenario, according to certain example embodiments. Further, FIG. 6 illustrates a time domain relationship, according to certain example embodiments. As illustrated in FIGS. 5 and 6, UE1 may allocate the resource(s) for the SL transmission from UE2 to UE1 and/or UE-n, and UE2 may have other SL peer UEs to communicate (not shown for simplicity).

At time instance t1, UE2 may communicate with UE-n by using an SCI (SCI-1), which indicates a set of reserved resources (e.g., denoted as A) for link 2 (e.g., identified by source/destination ID #2). As illustrated in FIGS. 5 and 6, resource a may be one resource from the reserved resource set A. This information may also be obtained by UE1 through its sensing procedure, for example, by receiving the SCI.

At time instance t2, UE-n may communicate with UE-m by using an SCI (SCI-2), which indicates a set of reserved resources (e.g., denoted as B) for link 3 (e.g., identified by source/destination ID #3). As illustrated in FIGS. 5 and 6, resource b may be one resource from the reserved resource set B. This information may also be obtained by UE1 through its sensing procedure, for example, by receiving the SCI. It is noted that t1 may be ahead or equal or later than t2, and FIG. 6 is only one example.

At time instance t3, UE1 may receive the ID-list from UE2 and/or UE-n, containing the ID(s) of link 2 and/or link 3 (e.g., source/destination ID #2 and/or source/destination ID #3). If inter-UE resource (re-)allocation is triggered, UE1 may exclude the resource(s) colliding with resources a and/or b from its inter-UE resource selection/allocation procedure. Thus, at time instance t4, the RA from UE1 to UE2 may exclude the resource(s) that collide with the other communication activities at UE2 and/or UE-n.

According to certain example embodiments, the ID list may be received by UE1 before SCI-1 and/or SCI-2 is received, if UE1 has not sent the resource allocation message to UE2 (e.g., t3<t1/t2<t4). In other example embodiments, if UE1 has already performed an inter-UE resource allocation before it detects the reserved resource(s) for other communication activities at UE2 and/or UE-n (e.g., t3<t4<t1/t2), it may trigger a resource (re-)allocation from UE1 to UE2. For example, this may occur upon UE1 detecting a collision between the resource(s) reserved by SCI-1/SCI-2 and the resource(s) reserved/allocated by the previous inter-UE RA.

Figure 7:
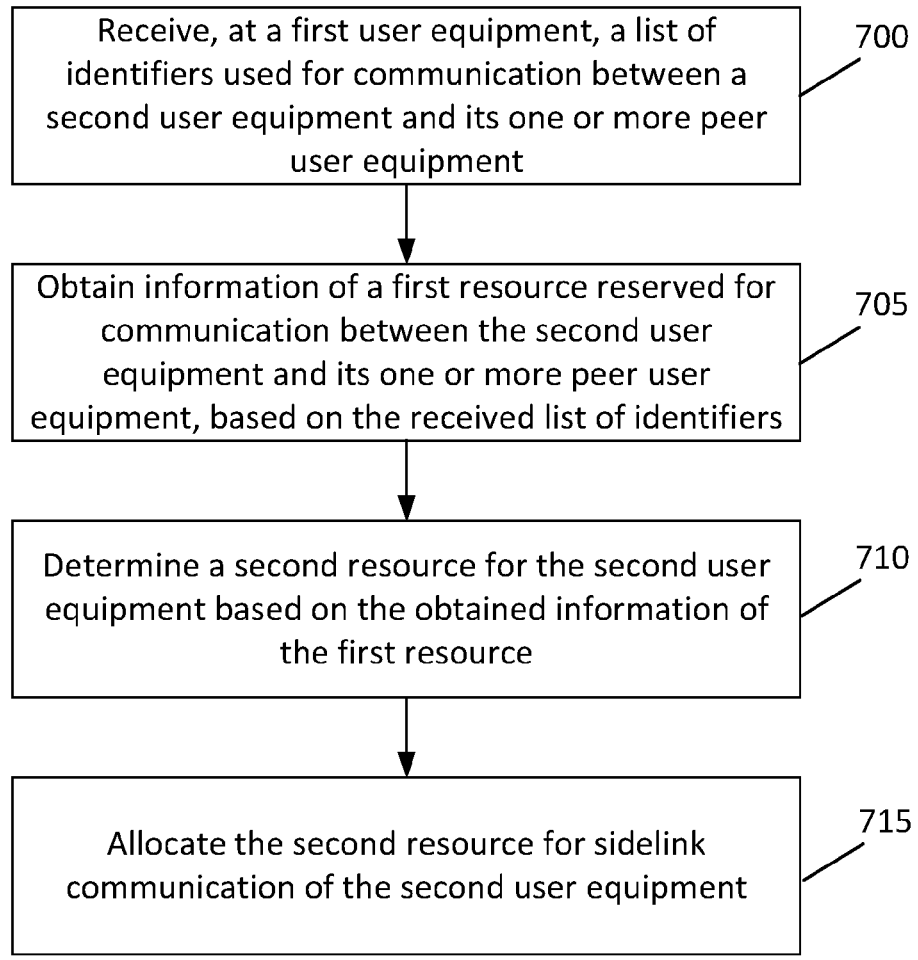
FIG. 7 illustrates a flow diagram of a method, according to certain example embodiments.

FIG. 7 illustrates a flow diagram of a method, according to certain example embodiments. In certain example embodiments, the flow diagram of FIG. 7 may be performed by a network entity or network node in a 3GPP system, such as LTE or 5G-NR. For instance, in an example embodiment, the method of FIG. 7 may be performed by a UE, for instance similar to apparatus 10 illustrated in FIG. 9(a). In addition, it is noted that although FIG. 7 illustrates a flow of 700 to 715, it is not a fixed order, and in other example embodiments, the flow of 700 to 715 may occur in other orders.

According to certain example embodiments, the method of FIG. 7 may include, at 700, receiving, at a first user equipment, a list of identifiers used for communication between a second user equipment and its one or more peer user equipment (UE). The method may also include, at 705, obtaining information of a first resource reserved for communication between the second user equipment and its one or more peer user equipment (UE), based on the received list of identifiers. The method may further include, at 710, determining a second resource for the second user equipment based on the obtained information of the first resource.

Further, the method may include, at 715, allocating the second resource for sidelink communication of the second user equipment.

According to certain example embodiments, the obtaining information of the first resource may include detecting, at the first user equipment, a sidelink resource reserved for sidelink communication related to an identifier. According to other example embodiments, the obtaining information of the first resource may also include detecting the identifier is one of the identifiers that is included in the received list of identifiers. According to other example embodiments, the obtaining information of the first resource may further include determining the sidelink resource used for sidelink communication related to the identifier as the first resource reserved for communication between the second user equipment and its one or more peer user equipment. According to further example embodiments, the list of identifiers may include at least one of one or more identifiers of the second user equipment used for communication between the second user equipment and the one or more peer user equipment, or one or more identifiers of the one or more peer user equipment in communication with the second user equipment. According to further example embodiments, the list of identifiers may include identifiers corresponding to at least one of priority of communication between the second user equipment and the one or more peer user equipment, or periodic communication between the second user equipment and the one or more peer user equipment.

According to certain example embodiments, the list of identifiers may include identifiers of a third user equipment in communication with other user equipment, and the allocated second resource from the first user equipment may be for transmission from the second user equipment to at least the third user equipment. According to some example embodiments, the receiving the list of identifiers may include at least one of receiving the list of identifiers from sidelink control information, receiving the list of identifiers from a medium access control control element, or receiving the list of identifiers from a radio resource control signaling message. According to further example embodiments, the method may also include receiving capability information of the second user equipment. In certain example embodiments, the capability information of the second user equipment may include information of whether the second user equipment supports multiple simultaneous transmission, or simultaneous transmission and reception.

In certain example embodiments, if the second user equipment does not support simultaneous transmission and reception, the second resource does not overlap in a time domain with a transmission resource for the second user equipment. In further example embodiments, the method may also include receiving capability information of the third user equipment. In some example embodiments, the capability information of the third user equipment may include information of whether the third user equipment supports simultaneous transmission and reception. In other example embodiments, if the third user equipment does not support simultaneous transmission and reception, the second resource does not overlap in a time domain with a transmission resource for the third user equipment. In further example embodiments, the first resource may correspond to at least one of a sidelink reception resource reserved for the second user equipment to receive from the one or more peer user equipment (UE), or a sidelink reception resource reserved by the second user equipment or allocated by another user equipment to transmit to the one or more peer user equipment.

Figure 8:
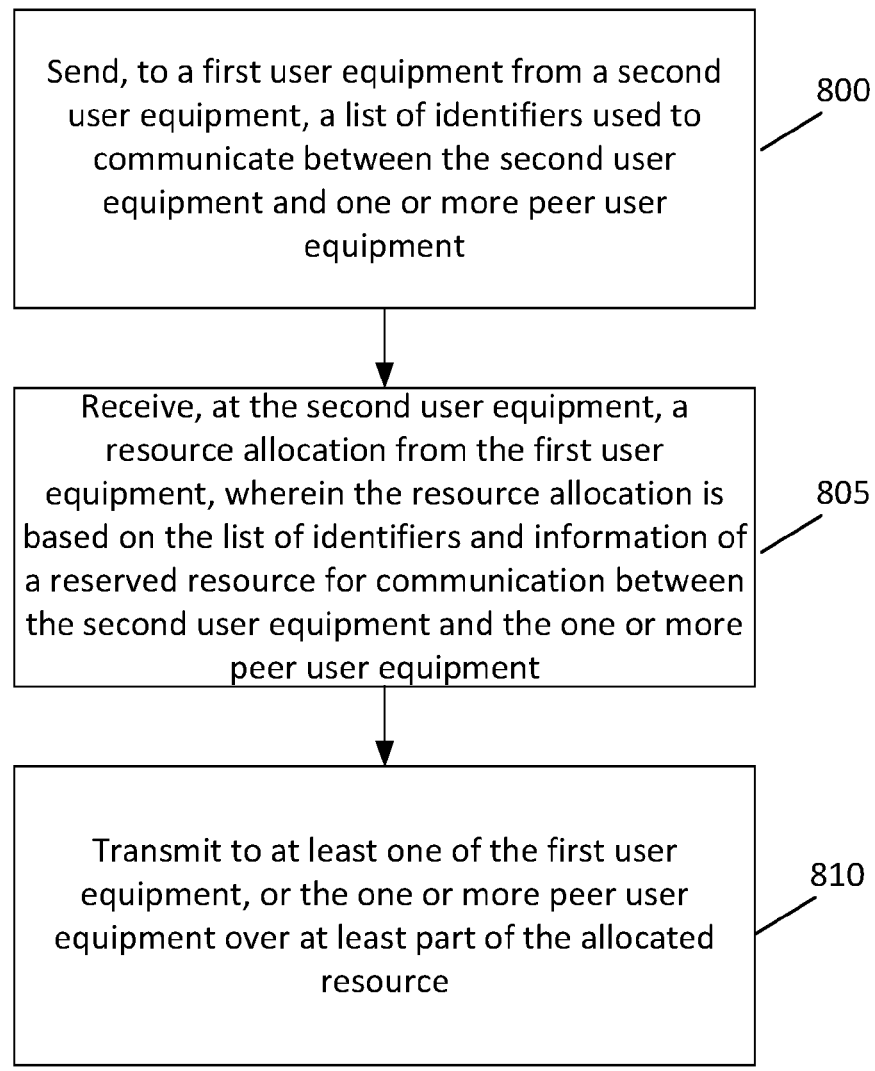
FIG. 8 illustrates a flow diagram of another method, according to certain example embodiments.

FIG. 8 illustrates a flow diagram of another method, according to certain example embodiments. In certain example embodiments, the flow diagram of FIG. 8 may be performed by a telecommunications network, network entity or network node in a 3GPP system, such as LTE or 5G-NR. For instance, in an example embodiment, the method of FIG. 8 may be performed by a UE, for instance similar to apparatus 10 illustrated in FIG. 9(*a*). In addition, it is noted that although FIG. 8 illustrates a flow of 800 to 810, it is not a fixed order, and in other example embodiments, the flow of 800 to 810 may occur in other orders.

According to certain example embodiments, the method of FIG. 8 may include, at 800, sending, to a first user equipment from a second user equipment, a list of identifiers used to communicate between the second user equipment and one or more peer user equipment. The method may also include, at 805, receiving, at the second user equipment, a resource allocation from the first user equipment. In certain example embodiments, the resource allocation may be based on the list of identifiers and information of a reserved resource for communication between the second user equipment and the one or more peer user equipment. The method may further include, at 810, transmitting to at least one of the first user equipment or the one or more peer user equipment (UEs) over at least part of the allocated resource.

According to certain example embodiments, the list of identifiers may include at least one of one or more identifiers of the second user equipment in communication with the one or more peer user equipment (UEs), one or more identifiers of the one or more peer user equipment in communication with the second user equipment, identifiers corresponding to priority of communication between the second user equipment and the one or more peer user equipment, or identifiers corresponding to periodic communication between the second user equipment and the one or more peer user equipment. According to other example embodiments, the list of identifiers may include identifiers of a third user equipment in communication with other user equipments (UEs). According to further example embodiments, the allocated resource from the first user equipment may be used for transmission from the second user equipment to at least the third use equipment. According to some example embodiments, the sending the list of identifiers may include at least one of sending the list of identifiers in sidelink control information, sending the list of identifiers in a medium access control control element, or receiving the list of identifiers in a radio resource control signaling message. According to further example embodiments, the method may include sending capability information of the second user equipment to the first user equipment. In certain example embodiments, the capability information of the second user equipment may include information of whether the second user equipment supports multiple simultaneous transmission, or simultaneous transmission and reception.

According to certain example embodiments, if the second user equipment does not support simultaneous transmission and reception, the allocated resource does not overlap in a time domain with a transmission resource for the second user equipment. According to some example embodiments, the method may also include sending capability information of the third user equipment. In certain example embodiments, the capability information of the third user equipment may include information of whether the third user equipment supports simultaneous transmission and reception. In further example embodiments, if the third user equipment does not support simultaneous transmission and reception, the allocated resource does not overlap in a time domain with a transmission resource for the third user equipment.

Figure 9A:
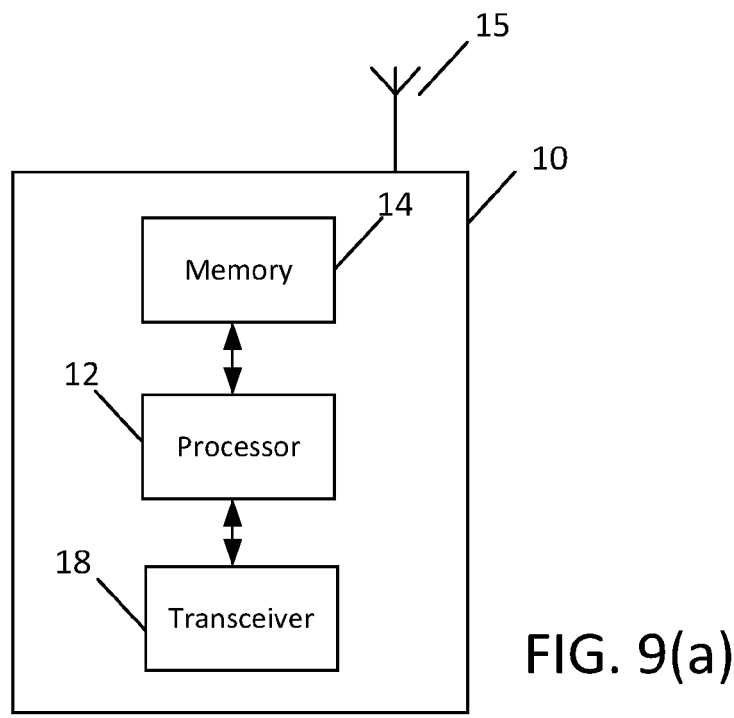
FIG. 9(a) illustrates an apparatus, according to certain example embodiments.

FIG. 9(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 9(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(a).

As illustrated in the example of FIG. 9(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-8.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to receive, at the apparatus, a list of identifiers used for communication between a second user equipment and its one or more peer user equipment (UEs).

Apparatus 10 may also be controlled by memory 14 and processor 12 to obtain information of a first resource reserved for communication between the second user equipment and its one or more peer user equipment, based on the received list of identifiers. Apparatus 10 may further be controlled by memory 14 and processor 12 to determine a second resource for the second user equipment based on the obtained information of the first resource. Further, apparatus 10 may be controlled by memory 14 and processor 12 to allocate the second resource for sidelink communication of the second user equipment.

In other example embodiments, apparatus 10 may be controlled by memory 14 and processor 12 to send, to a first user equipment from the apparatus, a list of identifiers used to communicate between the apparatus and one or more peer user equipment (UEs). Apparatus 10 may also be controlled by memory 14 and processor 12 to receive, at the apparatus, a resource allocation from the first user equipment. In certain example embodiments, the resource allocation may be based on the list of identifiers and information of a reserved resource for communication between the apparatus and the one or more peer user equipment (UEs). Apparatus 10 may further be controlled by memory 14 and processor 12 to transmit at least one of the first user equipment or the one or more peer user equipment (UEs) over at least part of the allocated resource.

Figure 9B:
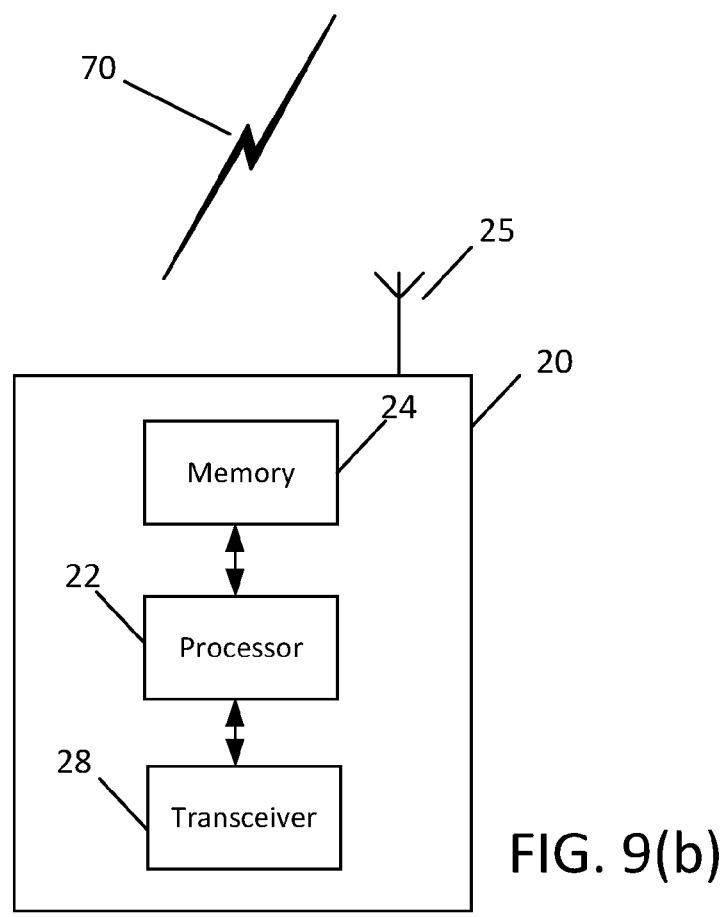
FIG. 9(b) illustrates another apparatus, according to certain example embodiments.

FIG. 9(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 9(b)

As illustrated in the example of FIG. 9(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

Further example embodiments may provide means for performing any of the functions or procedures described herein. For example, certain example embodiments may be directed to an apparatus that includes means for receiving, at the apparatus, a list of identifiers used for communication between a second user equipment and its one or more peer user equipment (UEs). The apparatus may also include means for obtaining information of a first resource reserved for communication between the second user equipment and its one or more peer user equipment (UEs), based on the received list of identifiers. The apparatus may further include means for determining a second resource for the second user equipment based on the obtained information of the first resource. In addition, the apparatus may include means for allocating the second resource for sidelink communication of the second user equipment.

Other example embodiments may be directed to a further apparatus that includes means for sending, to a first user equipment from the apparatus, a list of identifiers used to communicate between the apparatus and one or more peer user equipment (UEs). The apparatus may also include means for receiving, at the apparatus, a resource allocation from the first user equipment. In certain example embodiments, the resource allocation may be based on the list of identifiers and information of a reserved resource for communication between the apparatus and the one or more peer user equipment (UEs). The apparatus may further include means for transmitting to at least one of the first user equipment or the one or more peer user equipment (UEs) over at least part of the allocated resource.

Certain example embodiments described herein provide several technical improvements, enhancements, and/or advantages. In some example embodiments, it may be possible for a resource allocating UE to avoid allocating resource(s) that would collide with other communication activities at least one of the resource requesting UE and its peer UE. This enables the resource requesting UE transmit SL communication via the collision-free resource(s) allocated by the resource allocating UE. In other example embodiments, it may be possible to reduce signaling overhead comparing to transmit the detailed resource usage information from UE2 to UE1, since UE2 may derive this information by its sensing procedure autonomously based on the indicated a list of ID(s). That is, in certain example embodiments, it may be possible for the resource allocating UE to be aware of the resource usage of the resource requesting UE, which may impact the efficiency of inter-UE resource allocation.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

5GS 5G System
AS Access Stratum
CE Control Element
eNB Enhanced Node B
gNB 5G or Next Generation NodeB
ID Identifier
L-1 Layer-1
L-2 Layer-2
LTE Long Term Evolution
MAC Medium Access Control
NR New Radio
NW Network
RA Resource Allocation
RRC Radio Resource Control
RSRP Reference Signal Received Power
Rx Receiver
Sidelink SL
Tx Transmitter
UE User Equipment
UP User Plane

We claim:

1. A first user equipment, comprising:
at least one processor; and
at least one memory comprising computer program code, the at least one memory and computer program code are configured, with the at least one processor, to cause the first user equipment at least to
receive a list of identifiers used for communication between a second user equipment and its one or more peer user equipment;
obtain information of a first resource reserved for communication between the second user equipment and its one or more peer user equipment, based on the received list of identifiers;
determine a second resource for the second user equipment based on the obtained information of the first resource; and allocate the second resource for sidelink communication of the second user equipment.

2. The first user equipment according to claim 1, wherein the obtaining information of the first resource comprises the at least one memory and computer program code are configured, with the at least one processor, to cause the first user equipment to:
detect a sidelink resource reserved for sidelink communication related to an identifier;
detect the identifier is one of the identifiers that is included in the received list of identifiers; and
determine the sidelink resource used for sidelink communication related to the identifier as the first resource reserved for communication between the second user equipment and its one or more peer user equipment.

3. The first user equipment according to claim 1, wherein the list of identifiers comprises at least one of:
one or more identifiers of the second user equipment used for communication between the second user equipment and the one or more peer user equipment, or
one or more identifiers of the one or more peer user equipment in communication with the second user equipment.

4. The first user equipment according to claim 3, wherein the list of identifiers comprises identifiers corresponding to at least one of:
priority of communication between the second user equipment and the one or more peer user equipment, or
periodic communication between the second user equipment and the one or more peer user equipment.

5. The first user equipment according to claim 1,
wherein the list of identifiers comprises identifiers of a third user equipment in communication with other user equipment, and
wherein the allocated second resource from the first user equipment is used for transmission from the second user equipment to at least the third user equipment.

6. The first user equipment according to claim 5, wherein the at least one memory and computer program code are configured, with the at least one processor, to cause the first user equipment to:
receive capability information of the third user equipment,
wherein the capability information of the third user equipment comprises information of whether the third user equipment supports simultaneous transmission and reception.

7. The first user equipment according to claim 6, wherein if the third user equipment does not support simultaneous transmission and reception, the second resource does not overlap in a time domain with a transmission resource for the third user equipment.

8. The first user equipment according to claim 1, wherein the receiving the list of identifiers comprises the at least one memory and computer program code are configured, with the at least one processor, to cause the first user equipment to at least one of:
receive the list of identifiers from sidelink control information;
receive the list of identifiers from a medium access control element; or
receive the list of identifiers from a radio resource control signaling message.

9. The first user equipment according to claim 1, wherein the at least one memory and computer program code are configured, with the at least one processor, to cause the first user equipment to:
receive capability information of the second user equipment,
wherein the capability information of the second user equipment comprises information of whether the second user equipment supports multiple simultaneous transmission, or simultaneous transmission and reception.

10. The first user equipment according to claim 9, wherein if the second user equipment does not support simultaneous transmission and reception, the second resource does not overlap in a time domain with a transmission resource for the second user equipment.

11. The first user equipment according to claim 1, wherein the first resource corresponds to at least one of:
a sidelink reception resource reserved for the second user equipment to receive from the one or more peer user equipment, or
a sidelink reception resource reserved by the second user equipment or allocated by another user equipment to transmit to the one or more peer user equipment.

12. A second user equipment, comprising:
at least one processor; and
at least one memory comprising computer program code, the at least one memory and computer program code are configured, with the at least one processor, to cause the second user equipment at least to send, to a first user equipment, a list of identifiers used to communicate between the second user equipment and one or more peer user equipment;

receive a resource allocation from the first user equipment, wherein the resource allocation is based on the list of identifiers and information of a reserved resource for communication between the second user equipment and the one or more peer user equipment; and transmit to at least one of the first user equipment, or the one or more peer user equipment over at least part of the allocated resource.

13. The second user equipment according to claim 12, wherein the list of identifiers comprises at least one of:

one or more identifiers of the second user equipment in communication with the one or more peer user equipment, one or more identifiers of the one or more peer user equipment in communication with the second user equipment;

identifiers corresponding to priority of communication between the second user equipment and the one or more peer user equipment, or identifiers corresponding to periodic communication between the second user equipment and the one or more peer user equipment.

14. The second user equipment according to claim 13, wherein the list of identifiers comprises identifiers of a third user equipment in communication with other user equipment, and wherein the allocated resource from the first user equipment is used for transmission from the second user equipment to at least the third user equipment.

15. The second user equipment according to claim 14, wherein the at least one memory and computer program code are configured, with the at least one processor, to cause the second user equipment at least to:

send capability information of the third user equipment, wherein the capability information of the third user equipment comprises information of whether the third user equipment supports simultaneous transmission and reception.

16. The second user equipment according to claim 15, wherein if the third user equipment does not support simultaneous transmission and reception, the allocated resource does not overlap in a time domain with a transmission resource for the third user equipment.

17. The second user equipment according to claim 12, wherein the sending the list of identifiers comprises the at least one memory and computer program code are configured, with the at least one processor, to cause the second user equipment to at least one of:

send the list of identifiers in sidelink control information;

send the list of identifiers in a medium access control element; or receive the list of identifiers in a radio resource control signaling message.

18. The second user equipment according to claim 12, wherein the at least one memory and computer program code are configured, with the at least one processor, to cause the second user equipment to:

send capability information of the second user equipment, wherein the capability information of the second user equipment comprises information of whether the second user equipment supports multiple simultaneous transmission or simultaneous transmission and reception.

19. The second user equipment according to claim 18, wherein if the second user equipment does not support simultaneous transmission and reception, the allocated resource does not overlap in a time domain with a transmission resource for the second user equipment.

20. A method, comprising:

receiving, at a first user equipment, a list of identifiers used for communication between a second user equipment and its one or more peer user equipment;

obtaining information of a first resource reserved for communication between the second user equipment and its one or more peer user equipment, based on the received list of identifiers;

determining a second resource for the second user equipment based on the obtained information of the first resource; and allocating the second resource for sidelink communication of the second user equipment.

* * * * *